Nov. 4, 1958     J. F. HERRMANN     2,858,603
METHOD OF MAKING REFLECTORS FOR LIGHT SOURCES
Filed April 22, 1954
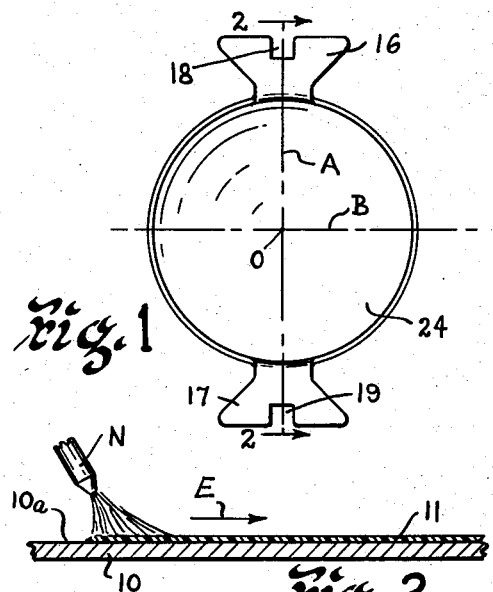
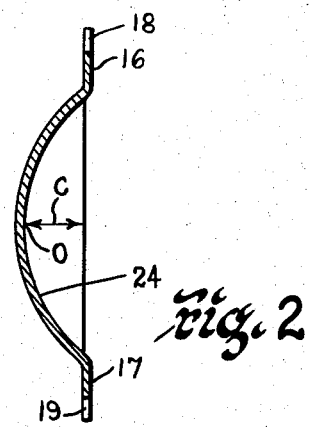
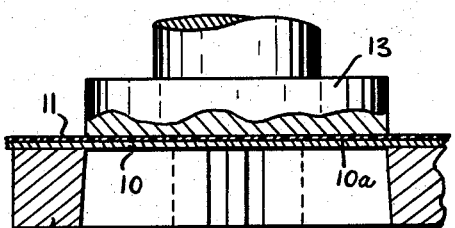
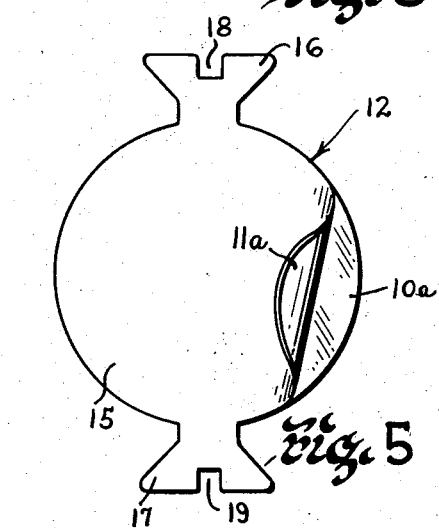
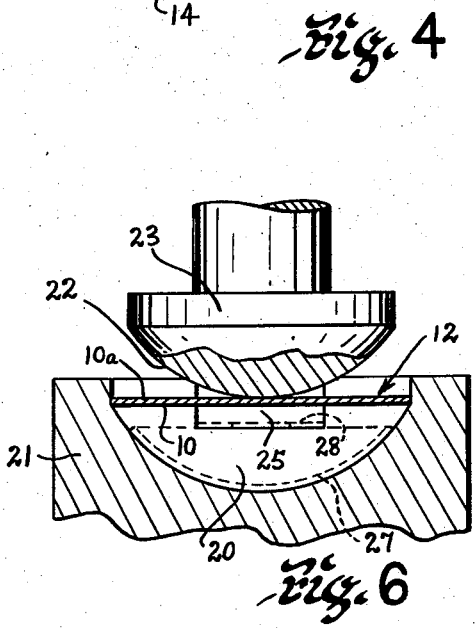
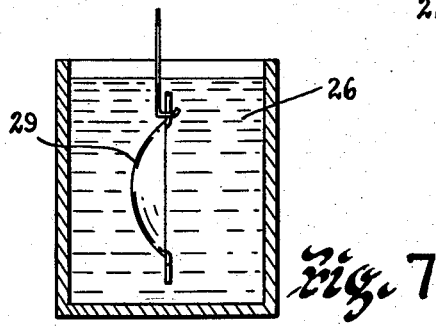
INVENTOR.
JOHN F. HERRMANN
BY *Louis L. Gagnon*
*Noble S. Williams*
ATTORNEYS

United States Patent Office 2,858,603
Patented Nov. 4, 1958

2,858,603

METHOD OF MAKING REFLECTORS FOR LIGHT SOURCES

John F. Herrmann, Lynnfield, Mass., assignor to American Optical Company, Southbridge, Mass., a voluntary association of Massachusetts Application April 22, 1954, Serial No. 424,936

1 Claim. (Cl. 29—534)

This invention relates to a method of making reflectors, mirrors and the like and more particularly refers to a method of making a metallic reflector or mirror construction having suitable high specular reflectivity suitable for use as a light source reflector in optical instruments and projectors of various types.

Spherically curved reflectors and mirrors formed of glass and coated on their front or rear faces with silver or aluminum reflective surfaces are commonly used at the present time rearwardly of filament type light sources of optical projectors for increasing the light output efficiency thereof. These reflectors have to be made fairly accurately and have to be of good optical quality in order to perform in the manner desired. Accordingly, they add appreciably to the cost of manufacture of the projectors. Also at times they are liable to become chipped or broken due to handling or heat of the instrument. Metal reflectors have also been used in projectors heretofore and while not subject to such breakage they have not been too desirable partly due to the fact that they have been expensive to make when good optical and lasting properties are required.

By use of the method of the present invention, however, spherical reflectors or mirrors formed of metal and of the optical properties described may be made accurately and economically and provided with long lasting specularly reflecting faces ideally suited for use in optical projectors and the like.

One of the primary objects of the present invention is, accordingly, to provide a new and improved method of making metallic reflectors and mirrors, suitable for use in optical instruments or the like, from sheet material or strip stock by a relative few easily performed method steps and whereby the mirror is first blanked from sheet metal or strip stock by suitably shaped punch and die members, the blank subsequently formed to the desired shape and simultaneously provided with a highly reflective optical finish by suitable forming dies and also surface treated when desired.

Another object of the present invention is to provide a rapid, practical and efficient method of making highly reflective metallic mirrors or the like as described above and of which the reflective surfaces are controlled to a very high degree of accuracy and quality of optical finish such as is normally obtainable only on optically worked glass mirrors and reflectors.

It is a further object of the present invention to provide a new and improved method of making a metallic mirror or reflector, of the type mentioned above, which is optically accurate and highly reflective yet inexpensive to manufacture and readily adaptable to mass production methods.

Another object of the present invention is to provide a new and improved method of making metallic mirrors and reflectors of the above mentioned type, whereby said mirrors and reflectors are provided with integrally formed mounting attachment brackets which are accurately shaped and located with respect to the optically finished reflective surfaces thereof, thus providing complete one-piece assemblies readily adaptable to exact positioning in the optical instruments for which they are intended without necessitating the use of adjustment means therefor.

Other objects and advantages of the present invention will become apparent from the detailed description which follows when taken in conjunction with the accompanying drawings in which:

Fig. 1 is a front elevational view of a finished spherical mirror or reflector;

Fig. 2 is a sectional view taken substantially on line 2—2 of Fig. 1 and looking in the direction of the arrows;

Fig. 3 is a sectional view of a sheet of metal stock and showing a step of the improved method;

Fig. 4 is a fragmentary sectional view of a punch and die for performing an additional step in the method and showing a sheet of prepared metal stock positioned therebetween;

Fig. 5 is an elevational view of a stamped mirror or reflector blank and showing the protective coating partially removed;

Fig. 6 is a fragmentary sectional view of a forming and finishing punch and mating die and showing the mirror or reflector blank positioned therein and just prior to the forming and finishing operation; and Fig. 7 is a sectional view of a dipping tank containing a treating liquid and showing the mirror or reflector immersed therein.

Referring more particularly to the drawings, wherein like characters of reference designate like parts throughout the several views, there is shown means and apparatus for performing an improved method of manufacturing metallic mirrors or reflectors of high optical properties which consists of the following steps:

A suitable sheet 10 of stock metal as shown in Fig. 3 and of the desired kind, thickness, surface quality and ductility is selected. Since the finished mirrors or reflectors, when positioned for use in optical instruments or the like are usually protected by the outer coverings or housings of said instruments, and thus are not subject to damage and misalignment due to handling etc. it is possible to select a relatively pure, soft metal which may be easily formed and surfaced to the desired shape and quality of finish required.

An example of such a metal would be a substantially pure aluminum of sheet or strip stock, preferably approximately .064 inch thick and with a semi-finished mirror surface 10a thereon. Such a finished stock obtainable at the present time is known in the trade as No. 2S–0 stock. By semi-finished mirror surface as used herein is meant a reflective surface having a satin finish or one with a considerable amount of sheen so that although a large percentage of the light received thereby is reflected, nevertheless most of such reflected light will be scattered light rather than specularly reflected light. However, other metallic materials and compositions, surface textures, finishes and thicknesses could also be used. Therefore it is to be noted that the examples given above as well as those set forth hereinafter in the description are given by way of illustration and are not intended to limit the scope of the claim.

The semi-finished mirror surface 10a of the sheet or strip stock 10 is washed clean by a suitable solvent and then covered by spraying, brushing or other known means with a protective coating 11. In Fig. 3 a spray nozzle N is shown and the arrow E indicates the direction of travel of the strip. The coating 11, being any one of many plastic, rubber, or plastic and rubber base compositions well known to the art, will provide a thin uniform and adhesive and yet pliable protective layer over the semi-finished mirror surface 10a of the metallic sheet or strip stock while same is being handled and worked. An example of such a pliable adhesive plastic or rubber base composition is known to the trade as "Strip Eze."

The coated strip stock 10 is next stamped or formed into blanks 12 as shown in Fig. 5 by means of a suitable punch 13 and die 14 (see Fig. 4), said punch and die being accurately machined to produce a blank 12 of the proper outline or contour and of suitable dimensions. The protective coating 11, prevents the semi-finished mirror surface 10a of the sheet or strip stock of metal from being marred, scratched or damaged in any way during the handling and blanking operations. It will be noted in Fig. 5 that the blank 12 consists of a large central generally circular portion 15 and two attachment ears or projecting portions 16 and 17 which are provided with a pair of accurately located locating slots 18 and 19. These ears and slots are useful both in the subsequent steps of the method and in the mounting of the finished mirror or reflector thereafter. Of course, a mirror of the type being described herein might be made without having such attachment ears and slots but would require other and separate less convenient attachment means for securing same in place in a projector or the like.

The proective coating 11 is next removed from the blank 12 after the blanking operation by simply peeling it away from the semi-finished mirror surface 10a of said blank starting at one edge 11a as shown in Fig. 5, care being taken not to touch this surface, thereby leaving said semi-finished mirror surface 10a free of all mars, scratches, and foreign matter such as lint, oil, finger prints, dust, etc. It is to be noted at this point that the protective coating 11, as previously described, is merely used as a precaution against damage or dirtying of the surface 10a of the sheet metal or strip stock. It might be that if extreme care in handling of said stock during the above blanking operation were used, the use of the protective coating 11 might be entirely eliminated. However, much more freedom is provided by use of the coating and accordingly same is preferred.

The blank 12 is next placed in the exactly contoured cavity 20 of a fixed forming die member 21 with the semi-finished mirror surface 10a upwardly so as to be engaged by a vertically movable forming die member 23 as shown in Fig. 6. The movable forming die 23 is provided with a hardened spherical surface 22 which is of an exact curvature which is complementary to the desired concave spherical surface 24 to be produced on the finished mirror. In addition to having an accurately formed spherical surface 22 on the forming die member 23, said surface is polished to an extremely high mirror finish; that is, to a finish which is comparable to an optically ground and polished lens surface.

The projecting ears 16 and 17 and the exactly located slots 18 and 19 therein serve to locate precisely the blank 12 in the diametrically opposed smaller cavities 25 in the die member 21 in Fig. 6 and thus establish the vertical axis A of the mirror as shown in Fig. 1, as well as the horizontal axis B of said mirror midway therebetween. These slots, therefore, being of controlled dimensions and located with respect to the optical center O of the mirror 24, subsequently provide a means of accurately mounting said mirror in an associated optical instrument or the like. It is to be noted, however, that the mirror 24 and spherical surface thereof, as described herein, is given by way of illustration only and that various other curved surfaces (for example elliptic, parabolic, etc.) may also be formed in a like manner.

Prior to the shaping or forming of the blank 12, the polished surface 22 of the die member 23 is oiled with a very light lubricating oil such as No. 2 machine oil or the like, and is then wiped clean with a soft, lint-free cloth or paper tissue to insure against any excess lubricant or foreign matter being trapped between the semi-finished mirror surface 10a of the blank and the polished surface 22 of the die member 23. Having prepared the surface 22 of the die member 23 and positioned the mirror blank 12 with the surface 10a upwardly in the cavity 20 with the projecting ears 16 and 17 in the recesses 25, as described above, a shaping or forming and coining operation is performed on the blank 12 and this is accomplished by forcing or driving the die member 23 downwardly rapidly into the cavity 20 of the die member 21 thus applying a pressure of approximately from 25,000 to 32,000 pounds per square inch to the large central circular portion 15 of the blank 12. This causes the central portion 15 to assume the spherical shape of the cavity 20 while being pressed slightly thinner than the original thickness of the stock metal. By so doing, the surface 10a of the blank will be "coined," or caused to assume substantially the same surface quality as that prepared on the polished surface 22 of the die member 23 as described above. It should be noted that the words "coined" and "coining," as used herein, are intended to mean an impressing or cold working of the ductile sheet metal stock at such great pressures to cause the metal in effect to flow and assume the shape and surface quality of the polished forming die member 23; surface texture or grain of the metal being substantially completely obliterated.

The surface 22 of the die member 23 must be wiped clean, as described above, before each forming and coining operation. Otherwise foreign matter, oil drops and the like may be coining into the surface of the mirror. However, it has been found that said surface 23 need only be oiled after each ten to twenty forming and coining operations. Furthermore, it has been found that the above described oiling procedure may be entirely eliminated certain conditions, said conditions depending upon the quality of mirrored surface desired, the pureness and ductility of the metal used, the pressures being used during the forming and surface coining operation, and types and sizes of mirrors to be produced.

During the above forming and coining operation the ears or projecting portions 16 and 17 of the blank 12 are located and held in the accurately formed recesses 25, said recesses 25 accurately locating the ears 16 and 17 and thus the center O of the finished mirror surface 24.

The mirror in its shaped coined position in the die member 21 is indicated by dotted lines at 27 in Fig. 6 and a projecting ear is indicated by dotted lines 28. The mirror is next removed from the cavity 20 of the forming die 21 and immersed in a cleaning solution 26 as shown at 29 in Fig. 7 for a controlled period of time. The cleaning solution 26 may be any one of many solutions well known to the trade and intended for use with this particular kind of metal stock being used. The time of immersion would depend, of course, upon the type and concentration of the solution selected. If the oiling of the forming punch 23 is eliminated, as described previously, the cleaning procedure might also be eliminated, providing the reflective quality of the finished mirror is suitable for its intended purpose. Upon completion of the cleaning period (which may be from 5 minutes to one half hour), which removes all impurities such as oil film, metal oxides etc. from the surface 24, the mirror is removed from the solution 26, rinsed thoroughly in water and air dried, thereby providing an accurately formed, highly reflective surface 24 with integral mounting means 16 and 17 precisely aligned therewith.

If desired the mirror surface thus formed upon the central portion 24 of the mirror or reflector could be coated with a known form of reflection increasing coating, such as a thin layer of magnesium fluoride, which of course will protect the surface from oxidation, but generally speaking this will not be necessary for the polished surface so produced has been found to be long lasting and the additional expense of the last mentioned coating would not be warranted especially wherein the total cost of the mirror or reflector is of material concern.

From the foregoing description it will be seen that there is provided a simple, efficient and economical method of making specularly reflective metallic mirrors and reflectors of high optical qualities. It is to be noted, however, that variations might be made in the above described method and accordingly all matter set forth herein is to be interpreted as illustrative and not in a limiting sense.

Having described the invention, I claim:

The method of making a reflector having a specularly reflective surface thereon for use with a light source of an optical projector or the like, said method comprising the steps of subjecting a piece of ductile sheet metal to a blanking operation so as to produce a blank of predetermined contour having a relatively large central portion and a plurality of relatively smaller attachment portions integral therewith, and located so as to have their center lines extending radially outwardly with respect to the center of said central portion and equidistantly spaced peripherally relatively to one another, and each attachment portion having an attachment opening accurately formed therein with respect to said center lines and said center during said blanking operation, positioning said blank between the convexly curved and concavely curved mating surfaces respectively of a pair of forming dies, the convexly curved die surface thereof being highly polished and of exact predetermined shape complimental to that desired in the finished specularly reflecting surface of said reflector, and with said attachment portions assembled in and exactly located by locating recesses formed in the forming die provided with said convex surface, said assembled attachment portions and recesses being such as to locate said center of said central portion in exact alignment with the centers of said convexly curved and concavely curved surfaces on said forming dies, and rapidly forcing with pressure said convexly curved die against said blank so as to drive said central portion into said concavely curved die with a force sufficient to concavely shape said central portion and coin thereon a highly specularly reflecting optical surface of concave shape which has its optical center substantially exactly equally spaced from each of said attachment openings.

References Cited in the file of this patent

UNITED STATES PATENTS

| | | |
|---|---|---|
| 1,060,361 | Rea | Apr. 29, 1913 |
| 1,625,648 | Godley | Apr. 19, 1927 |
| 1,831,541 | Oestnaes | Nov. 10, 1931 |
| 1,943,978 | Luce | Jan. 16, 1934 |
| 1,950,005 | Luce | Mar. 6, 1934 |
| 1,982,318 | Oestnaes | Nov. 27, 1934 |
| 1,990,389 | Ott | Feb. 5, 1935 |
| 2,082,791 | Copeman | June 8, 1937 |

FOREIGN PATENTS

| | | |
|---|---|---|
| 616,042 | Great Britain | Jan. 14, 1949 |